(12) United States Patent
Arihara

(10) Patent No.: US 8,373,817 B2
(45) Date of Patent: Feb. 12, 2013

(54) BACKLIGHT UNIT HAVING A LIGHT GUIDE PLATE WITH A CUT OUT AND A BACK CASE WITH A CONCAVE DRAWING PORTION AND LIQUID CRYSTAL DISPLAY DEVICE USING THE SAME

(75) Inventor: Tsutomu Arihara, Saitama-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 461 days.

(21) Appl. No.: 12/610,693

(22) Filed: Nov. 2, 2009

(65) Prior Publication Data

US 2010/0195014 A1  Aug. 5, 2010

(30) Foreign Application Priority Data

Feb. 4, 2009 (JP) ................. P2009-024198

(51) Int. Cl.
*G02F 1/1333* (2006.01)
*G02F 1/1335* (2006.01)
*F21V 7/04* (2006.01)

(52) U.S. Cl. .............. 349/58; 349/65; 349/69; 362/612; 362/615

(58) Field of Classification Search .................... 349/58, 349/65, 69; 362/612, 613, 615
See application file for complete search history.

(56) References Cited

U.S. PATENT DOCUMENTS

| 2003/0128307 | A1* | 7/2003 | Ito et al. ........................... 349/58 |
| 2003/0164903 | A1* | 9/2003 | Saito et al. ...................... 349/58 |
| 2006/0264093 | A1* | 11/2006 | Shim ............................ 439/495 |
| 2007/0115691 | A1* | 5/2007 | Yu ................................ 362/632 |
| 2007/0217219 | A1* | 9/2007 | Makuta et al. ................ 362/606 |
| 2008/0266900 | A1* | 10/2008 | Harbers et al. ................ 362/609 |
| 2009/0115930 | A1* | 5/2009 | Chuang et al. ................. 349/58 |
| 2009/0122230 | A1* | 5/2009 | Ochiai ............................. 349/65 |
| 2011/0134364 | A1* | 6/2011 | Neyama et al. ................ 349/62 |

FOREIGN PATENT DOCUMENTS

| JP | 2005-315957 | 11/2005 |
| JP | 2008-20749 | 1/2008 |

* cited by examiner

*Primary Examiner* — Mark Robinson
*Assistant Examiner* — Dennis Y. Kim
(74) *Attorney, Agent, or Firm* — Oblon, Spivak, McClelland, Maier & Neustadt, L.L.P.

(57) ABSTRACT

A backlight unit includes a rectangular light guide plate including a first edge and a second edge orthogonally crossing each other. A light source arranged on a flexible substrate emits light to the first edge of the light guide plate and then the light emitted from the light source is emitted to outside from an upper surface of the light guide plate. A connection flexible substrate is connected to the flexible substrate and arranged along the second edge of the light guide plate to outside of the backlight unit. The second edge of the light guide plate facing the connection flexible substrate is cut out at an acute angle to the first edge of the light guide plate to pass around the connection flexible substrate.

14 Claims, 5 Drawing Sheets

BACKLIGHT UNIT HAVING A LIGHT GUIDE PLATE WITH A CUT OUT AND A BACK CASE WITH A CONCAVE DRAWING PORTION AND LIQUID CRYSTAL DISPLAY DEVICE USING THE SAME

CROSS-REFERENCE TO RELATED APPLICATION

This application is based upon and claims the benefit of priority from prior Japanese Patent Application No. 2009-024198 filed Feb. 4, 2009, the entire contents of which are incorporated herein by reference.

BACKGROUND OF THE INVENTION

1. Field of the Invention

The present invention relates to a backlight unit having a light guide plate as a flat light source and a liquid crystal display device using the backlight unit.

2. Discussion of the Background

Liquid crystal display devices have been widely used as display devices for OA equipment such as personal computers or word processor and audiovisual equipment such as TV sets, video movies and car navigations because the display devices have many advantages such as lightweight, compact, and low power consumption. In these liquid crystal display devices, a backlight unit having a light guide plate is equipped at a rear side of the liquid crystal display device to illuminate the liquid crystal display panel from the rear side. Recently, a flat light source formed of light emitting diodes (LEDs) has been used. Here, the backlight unit is classified into an edge light type and a direct backlight type. For example, the edge light type includes a light source such as discrete light sources (LEDs) and fluorescent tubes to illuminate light to an edge of a light guide plate facing the liquid crystal display panel. On the other hand, in the direct backlight type, a plurality of light sources made of linear tubes such as the fluorescent tubes are arranged at a back side of the liquid crystal display panel interposing a light diffusion plate therebetween. The edge light type is superior to the direct backlight type in the aspect of compactness. Therefore, the edge light type is suitable to the displays such as mobile electronic equipments or note type personal computers.

In the edge light type, it is necessary to hold the light guide plate and the light source by a frame of the liquid crystal display panel. For example, a construction to clip the light guide plate between the frame and a back cover or another construction to hold the light guide plate in the frame by a double face tape is proposed. The former construction may be superior to the latter because an additional element such as the double face tape is not required to attach the light guide plate and the manufacturing process is simplified.

When the light guide plate is built onto a frame, it is necessary to precisely position the light guide plate. For example, Japanese patent application No. 2005-315957 describes a technology in which a first concave groove and a second concave groove are formed in a side edge of the light guide plate. The first concave grove is used to position the light guide plate and the second concave grove is used to fix the light guide plate with the frame by screws. The respective grooves have a pair of side walls which intersect with another side wall arranged therebetween in parallel with the edge of the light guide plate and taking the form of an acute angle to the other side wall to prevent looking of shining from the side walls of the grooves.

Meanwhile, a narrow frame in the liquid crystal display device has been widely adopted recently. To match the narrow frame, when a flexible wiring substrate is retrieved from a substrate equipped with a light source such as light emitting diodes (LEDs), it is required to make a space to pass around the flexible wiring substrate by arranging the shape of the light guide plate. Practically, if a part of the side edge of the light guide plate is cut out in a groove shape to make a space to pass around the flexible wiring substrate, some rectangular corner portions in the light guide plate may be formed, which causes bright lines to be viewed or a concentration of stress being applied to the corner portions. The stress may further cause destruction of the light guide plate in a following mechanical test.

BRIEF SUMMARY OF THE INVENTION

The present invention has been made to address the above mentioned problems. One object of this invention is to provide a high quality backlight unit of an edge light type.

Thus, according to one aspect of the invention, there is provided a backlight unit including: a rectangular light guide plate including a first edge and a second edge orthogonally crossing each other; a flexible substrate arranged along the first edge of the light guide plate; a light source arranged on the flexible substrate and emitting light to the first edge of the light guide plate, light emitted from the light source being emitted to outside from an upper surface of the rectangular light guide plate; and a connection flexible substrate electrically connected to the light source arranged on the flexible substrate and arranged along the second edge of the light guide plate to outside of the backlight unit, wherein the second edge of the light guide plate facing the connection flexible substrate is cut out at an acute angle to the first edge of the light guide plate, forming an inclined cut out edge on the second edge.

According to another aspect of the invention, there is provided a backlight unit including: a rectangular light guide plate including a first edge and a second edge orthogonally crossing each other; a flexible substrate arranged along the first edge of the light guide plate; a light source arranged on the flexible substrate and emitting light to the first edge of the light guide plate, light emitted from the light source being emitted to outside from an upper surface of the rectangular light guide plate; a connection flexible substrate electrically connected to the light source arranged on the flexible substrate and arranged along the second edge of the light guide plate to outside of the backlight unit; and an upper frame to cover the light guide plate defining a valid illumination area, wherein the second edge of the light guide plate facing the connection flexible substrate is cut out at an acute angle to the first edge of the light guide plate forming an inclined cut out edge, and wherein the cut out edge crosses with the first edge of the light guide plate at outside of the valid illumination area.

According to another aspect of the invention, there is provided a liquid crystal display device including: a backlight unit which includes a rectangular light guide plate including a first edge and a second edge orthogonally crossing each other; a flexible substrate arranged along the first edge of the light guide plate; a light source arranged on the flexible substrate and emitting light to the first edge of the light guide plate, light emitted from the light source being emitted to outside from an upper surface of the rectangular light guide plate; and a connection flexible substrate electrically connected to the light source arranged on the flexible substrate and arranged along the second edge of the light guide plate to outside of the backlight unit, wherein the second edge of the light guide plate facing the connection flexible substrate is cut out at an acute angle to the first edge of the light guide plate forming an inclined cut out edge, and a liquid crystal display panel arranged on the backlight unit, wherein the inclined cut out edge of the second edge crosses with the first edge of the light guide plate at outside of a valid display area of the liquid crystal display panel.

According to further another aspect of the invention, there is provided a method for assembling a backlight unit, including: providing a light guide plate having a first and a second edges in a rectangular shape; arranging a reflective sheet having a bottom plate and side walls built on edges of the bottom plate facing the first edge and the second edge of the light guide plate so as to surround the light guide plate; arranging a flexible substrate along the first edge of the light guide plate, a light source being arranged on the flexible substrate to emit light from the light source to the first edge of the light guide plate; cutting out the light guide plate along the second edge at an acute angle from a portion of the second edge to the first edge of the light guide plate to form an inclined cut out edge; and receiving the flexible substrate to outside along the inclined cut out edge of the light guide plate.

BRIEF DESCRIPTION OF THE DRAWINGS

A more complete appreciation of the invention and many of the attendant advantages thereof will be readily obtained as the same becomes better understood by reference to the following detailed description when considered with the accompanying drawings.

DETAILED DESCRIPTION OF THE INVENTION

Figure 1:
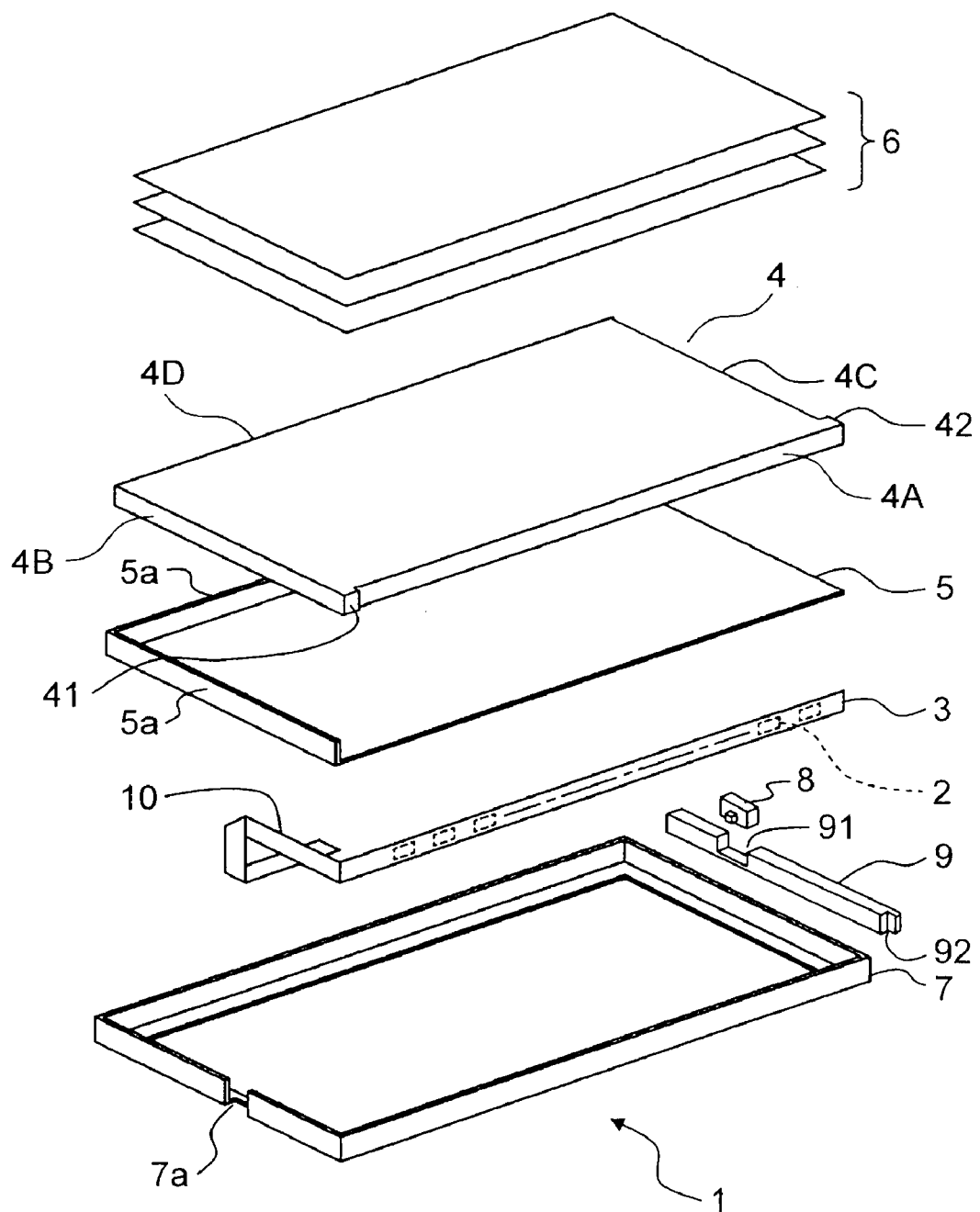
FIG. 1 is an exploded perspective view showing a backlight unit according to an embodiment of the present invention.

A backlight unit and a liquid crystal display device using the backlight unit according to an exemplary embodiment of the present invention, in particular, a backlight unit having a light guide plate of an edge light type will now be described with reference to the accompanying drawings wherein the same or like reference numerals designate the same or corresponding parts throughout the several views.

Figure 2:
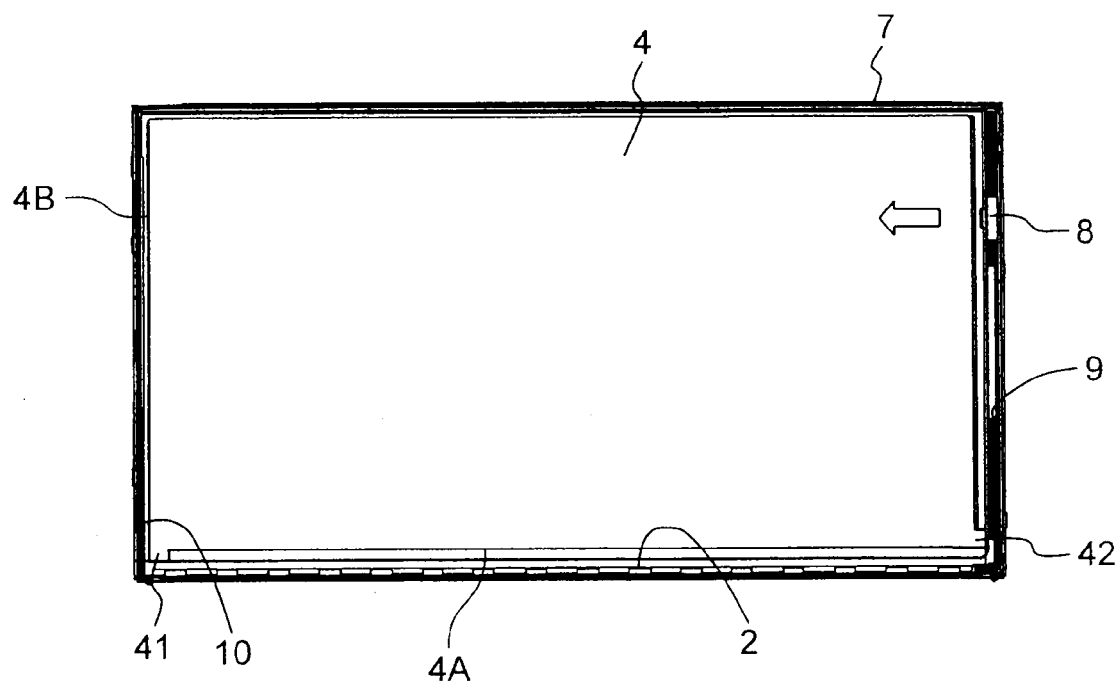
FIG. 2 is a schematic plan view showing the backlight unit according to an embodiment of the invention.

FIGS. 1 and 2 are an exploded perspective view and a schematic plan view showing a backlight unit according to a first embodiment of the invention, respectively. The backlight unit 1 includes a flexible substrate (Flexible Printed Circuit: FOC) 3 in which a plurality of light emitting diodes (LEDs) 2 are mounted, a light guide plate 4 in a rectangular shape, a reflective sheet 5, optical sheets 6, a white plastic holding element 9 and an elastic element 8 fitted to a concave portion 91 in the plastic holding element 9.

Furthermore, the above parts are contained in a metal back case 7 in a flat box shape. Light emitted from the LEDs 2 as a light source is converted to a flat light by the light guide plate 4, then emitted from an emission surface (upper surface) of the light guide plate 4 as flat light. The light guide plate 4 includes a pair of protrusion portions 41 and 42 formed at both ends of a longitudinal edge 4A of the light guide plate 4. The protrusion portion 41 of the light guide plate 4 is projected along a narrow edge 4B of the light guide plate 4. On the other hand, the protrusion portion 42 is projected along a longitudinal edge 4A. A flexible substrate 3 in which LEDs 2 as a light source are mounted in line is arranged along the longitudinal edge 4A of the light guide plate 4. The light guide plate 4 is stably held in the metal back case 7 by the plastic holding element 9. The plastic holding element 9 is arranged along a narrow edge 4C of the light guide plate 4 by fitting a concave portion 92 formed at an edge portion of the plastic holding element 9 with the protrusion portion 42 formed in the light guide plate 4. The plastic holding element 9 is provided with the elastic element 8 made by rubber fitted to a concave portion 91. The elastic element 8 pushes the light guide plate 4 to the narrow edge 4B side of the metal back case 7 to hold the light guide plate 4 in the metal back case 7. The elastic element 8 is located closer to a longitudinal edge 4D than the longitudinal edge 4A.

In this embodiment, the light guide plate 4 is pushed to the narrow edge 4B side of the metal back case 7 by the elastic element 8 as shown in an arrow in FIG. 2 and the protrusion portion 41 contacts a surface of the flexible substrate 3. Moreover, the protrusion portion 42 of the light guide plate 4 is fitted to the concave portion 92 formed in the plastic holding element 9. Accordingly, the fixing of the light guide plate 4 with the metal back case 7 is reliably made, and undesired contact of the light guide plate 4 with the flexible substrate 3 in which LEDs 2 are mounted is prevented. A reflective sheet 5 is arranged at a lower side of the light guide plate 4. A reflective side wall 5a that also works as a reflector is built on the reflective sheet 5 along the narrow edge 4B and the longitudinal edge 4D of the light guide plate 4. The reflective side wall 5a is not provided at edges corresponding to the flexible substrate 3 and the plastic holding element 9. Further, optical sheets 6 are arranged on the light guide plate 4. The light emitted from the LEDs 2 is incident to the longitudinal edge 4A of the light guide plate 4 facing the LEDs 2. Then the light passes in the light guide plate 4 or is reflected by the reflect sheet 5. Consequently, the light is emitted from an upper surface of the light guide plate 4 and then illuminates the liquid crystal display panel through the optical sheets 6. The backlight unit 1 according to this embodiment adopts a side light type as described-above.

A connection flexible substrate 10 (FPC) is electrically connected to the flexible substrate 3 in which the LEDs 2 are mounted. The connection flexible substrate 10 electrically connects the LEDs 2 to an outside circuit such as a power circuit by passing the flexible substrate 3 around the second edge of the light guide plate 4. When the connection flexible substrate 10 is passed around, it is necessary to precisely design a location to retrieve the connection flexible substrate 10 to outside and to prepare a space to retrieve the connection flexible substrate 10. Particularly, the space around the light guide plate 4 in a backlight unit 1 for a narrow frame liquid crystal display panel is tiny and it is difficult to pass the connection flexible substrate 10 around along the light guide plate 4.

In this embodiment, the connection flexible substrate 10 is retrieved from the backlight unit 1 along the narrow edge 4B of the light guide plate 4, which orthogonally crosses with the longitudinal edge 4A where the emitted light from the LEDs 2 is incident. If a longitudinal edge 4A of the metal back space 7 corresponding to the longitudinal edge 4A of the light guide plate 4 facing the LEDs 2 is cut out to form a retrieve portion, light leak or penetration of outside light may be caused, which results in a reduction in light source quality because of brightness unevenness.

The connection flexible substrate 10 is retrieved along the narrow edge 4B of the light guide plate 4 and further to outside of the metal back case 7 from the concave portion 7a formed in the narrow edge of the metal back case 7. Then the connection flexible substrate 10 is folded back to a bottom surface side of the metal back case 7. Accordingly, the cut out of the metal back case 7 at an edge facing the longitudinal edge 4A of the light guide plate 4 is not required and the reduction in a light source quality due to the bright unevenness is not caused.

Figure 3:
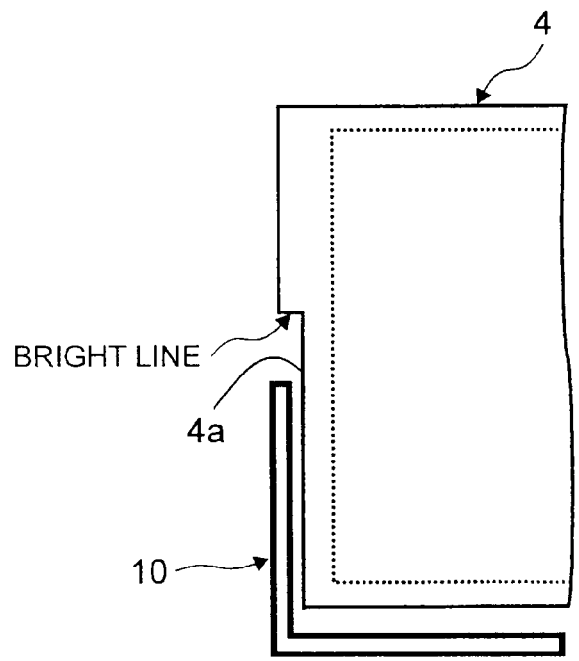
FIG. 3 is a schematic plan view showing one example of the light guide plate in which a groove to pass around a flexible substrate is formed in the light guide plate.

In a backlight unit for a narrow frame liquid crystal display device, a space between the light guide plate 4 and the metal back case 7 is tiny. Therefore, the tiny space bars to freely pass the connection flexible substrate 10 around the space along the narrow edge 4B. To resolve this problem, that is, to get the space, it is thought to form a cut out portion 4a in a rectangular shape in a part of the narrow edge 4B of the light guide plate 4 as shown in FIG. 3. However, if the cut out portion 4a in a rectangular shape is formed, bright lines may be generated at the corner portions of the light guide plate 4 and a crack in the light guide plate 4 may be easily caused by concentration of stress applied to the corner portions.

Figure 4A:
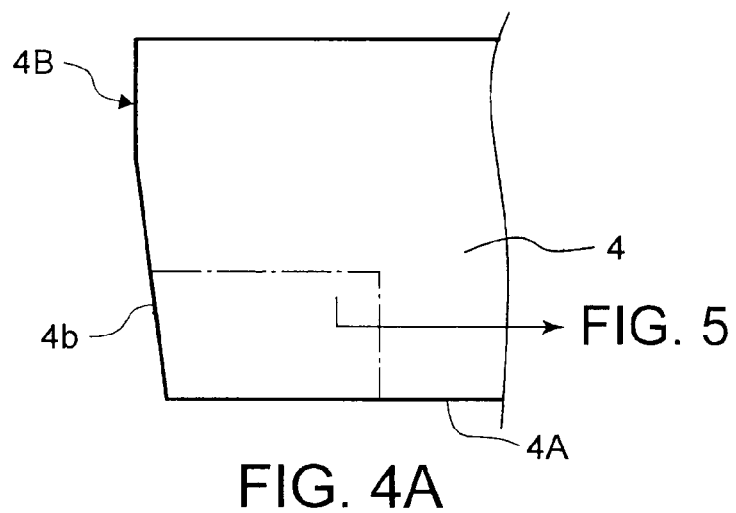
FIG. 4A is a schematic plan view showing a shape of the light guide plate according to an embodiment of the present invention.
Figure 4B:
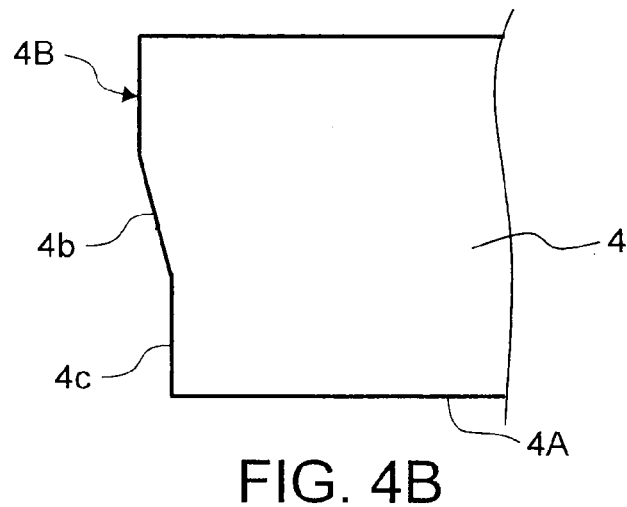
FIG. 4B is a schematic plane view showing another shape of the light guide plate according to an embodiment of the present invention.
Figure 5:
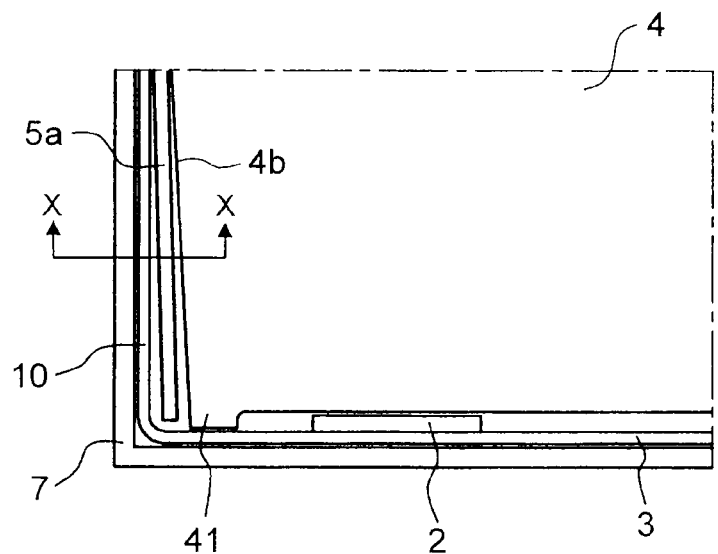
FIG. 5 is a schematic plan view showing a portion of the light guide plate in which the flexible substrate passes around along the light guide plate according to an embodiment of the present invention.

In this embodiment as shown in FIG. 4A, a part of the narrow edge 4B of the light guide plate 4 facing the connection flexible substrate 10 is cut out to form an inclined cut out portion 4b which inclines to the longitudinal edge 4A. As shown in FIG. 4B, it is also possible to continuously form the inclined cut out edge 4b and a linearly cut out edge 4c. In this case, if connection portions to connect the linear narrow edge 4B with the inclined cut out edge 4b and to connect the inclined cut out edge 4b with the linearly cut out edge 4c are smoothly formed, the generation of the bright lines is more effectively suppressed. In FIGS. 4 and 5, the protrusion portion 41 is abbreviated.

According to the inclined cut out edge 4b formed in the narrow edge 4B in the light guide plate 4, the space to freely pass around the connection flexible substrate 10 is obtained. Therefore, it becomes possible to suppress the generation of the bright lines even if the backlight unit 1 is applied to a narrow frame liquid crystal display panel.

FIG. 5 is a schematic plan view showing a portion of the backlight unit 1 in which the connection flexible substrate 10 is passed around along the light guide plate 4 according to the first embodiment of the invention.

Figure 6:
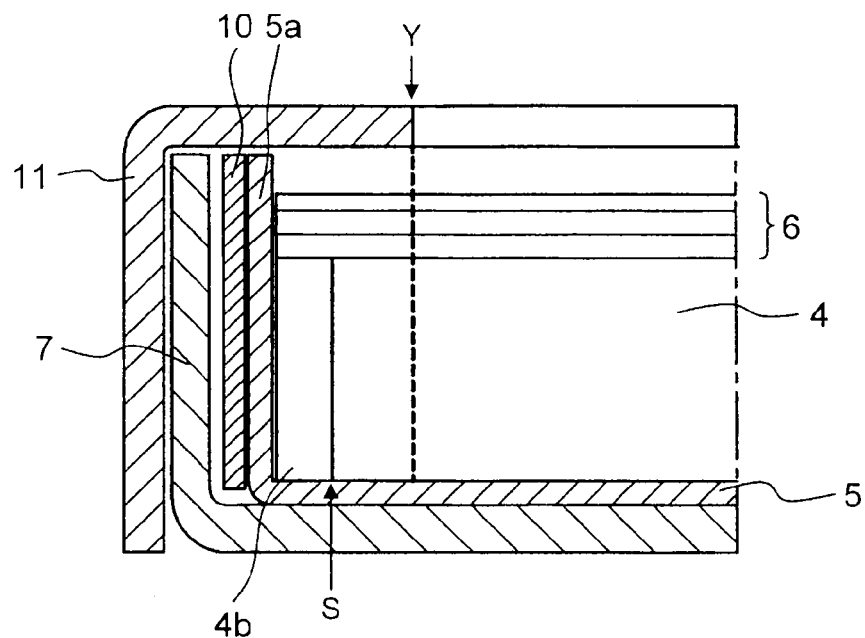
FIG. 6 is a schematic cross-sectional view taken along a line X-X in FIG. 5.

FIG. 6 is a schematic cross-sectional view taken along a line X-X in FIG. 5. FIG. 6 shows a backlight unit 1 in which the backlight unit 1 is covered with a front case 11. As shown in FIGS. 5 and 6, the inclined cut out edge 4b is formed along the narrow edge 4B of the light guide plate 4 to pass around the connection flexible substrate 10. Therefore, the space between the light guide plate 4 and the metal back case 7 is expanded. That is, enough space is obtained to pass around the connection flexible substrate 10, even if the backlight unit 1 is implemented in the narrow frame liquid crystal display panel. If the reflective sidewall 5a is formed along the inclined cut out edge 4b in advance, the space may be easily formed. It is also possible to press the connection flexible substrate 10 into the space between the metal back case 7 and the reflective side wall 5a without transforming the reflective side wall 5a in advance. In this case, although the reflective side wall 5a and the metal back case 7 are arranged in parallel, the reflective side wall 5a is elastically transformed closing to the inclined cut out edge 4b of the light guide plate 4. In this case, the reflective side wall 5a is made of elastic plastic material.

Figure 7:
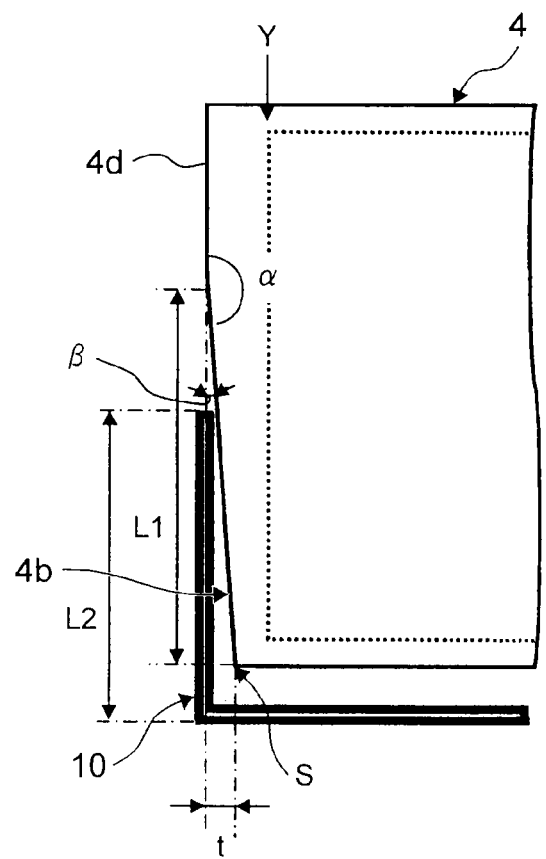
FIG. 7 is a schematic plan view showing a relationship of the dimensions between an inclined cut out portion of the light guide plate and the flexible substrate.

The bright lines caused at the corner portions with a rectangular shape are remarkably suppressed by forming the inclined cut out edge 4b with a tapered shape and the mechanical strength of the light guide plate 4 is weakened. When the inclined cut out edge 4b is formed, it is desirable to design the inclined angle as small as possible. FIG. 7 is a schematic plan view showing a relation ship of the dimensions between the inclined cut out edge 4b of the light guide plate 4 and the connection flexible substrate 10. It is possible to suppress the generation of the bright lines and raise the mechanical strength by designing the inclined angle $\beta$ so that the inclined angle $\beta$ is set as small as possible, that is, an angle $\alpha$ is set as large as possible and close to 180 degrees.

The inclined angle $\beta$ is determined in consideration of a valid display area of the liquid crystal display device, that is, a valid light emitting area of the backlight unit 1 when the backlight unit 1 is implemented in the liquid crystal display device. If an end edge portion S in the longitudinal edge 4A of the light guide plate 4, where the inclined cutout edge 4b crosses with the longitudinal edge 4A is located inside of the valid light emitting area line Y, bright unevenness may be caused. Accordingly, the inclined angle $\beta$ of the inclined cut out edge 4b is designed so that the end edge portion S in the longitudinal edge 4A of the light guide plate 4 is not located within the valid light emitting area line Y as shown in FIGS. 6 and 7. Practically, the inclined angle $\beta$ is determined by drawing a line from a portion of a flat edge 4d to the longitudinal edge 4A so that the drawn line does not contact with the connection flexible substrate 10 when the connection flexible substrate 10 is arranged at a corner portion where the longitudinal edge 4A and the narrow edge 4B of the light guide plate 4 cross in the plan view shown in FIG. 7.

If back distance (t) is required to be set small, the shape of the light guide plate 4 according to the second embodiment shown in FIG. 4B is applicable.

Further, the length L1 of the cut out edge 4b is designed in consideration of the length L2 of the connection flexible substrate 10 and the location where the elastic element 8 is equipped in the plastic holding element 9, that is, the length of the flat edge 4d, in which a pressure by the elastic element 8 is applied. Of course, it is desirable to design the length L1 of the inclined cut out edge 4b larger than the length L2 of the connection flexible substrate 10. Further, it is desirable to make a corresponding flat edge 4d of the narrow edge 4B flat, which faces a location where the elastic element 8 is equipped to apply pressure to the light guide plate 4. Therefore, the length L1 of the inclined cut out edge 4b is designed in which the starting edge of the inclined cut out edge is located closer to the longitudinal edge 4A than the corresponding location of the narrow edge 4B where the elastic element 8 is equipped in the plastic holding element 9.

As one practical design, for example, when the thickness of the connection flexible substrate 10 is 0.2 mm, the inclined angle $\beta$ of the inclined cut out edge 4b is set 1.2° (angle $\alpha$=178.8°) and the back distance (t) is set at 0.3 mm. Consequently, it becomes possible to pass around the connection flexible substrate 10 without generating the bright lines.

Figure 8:
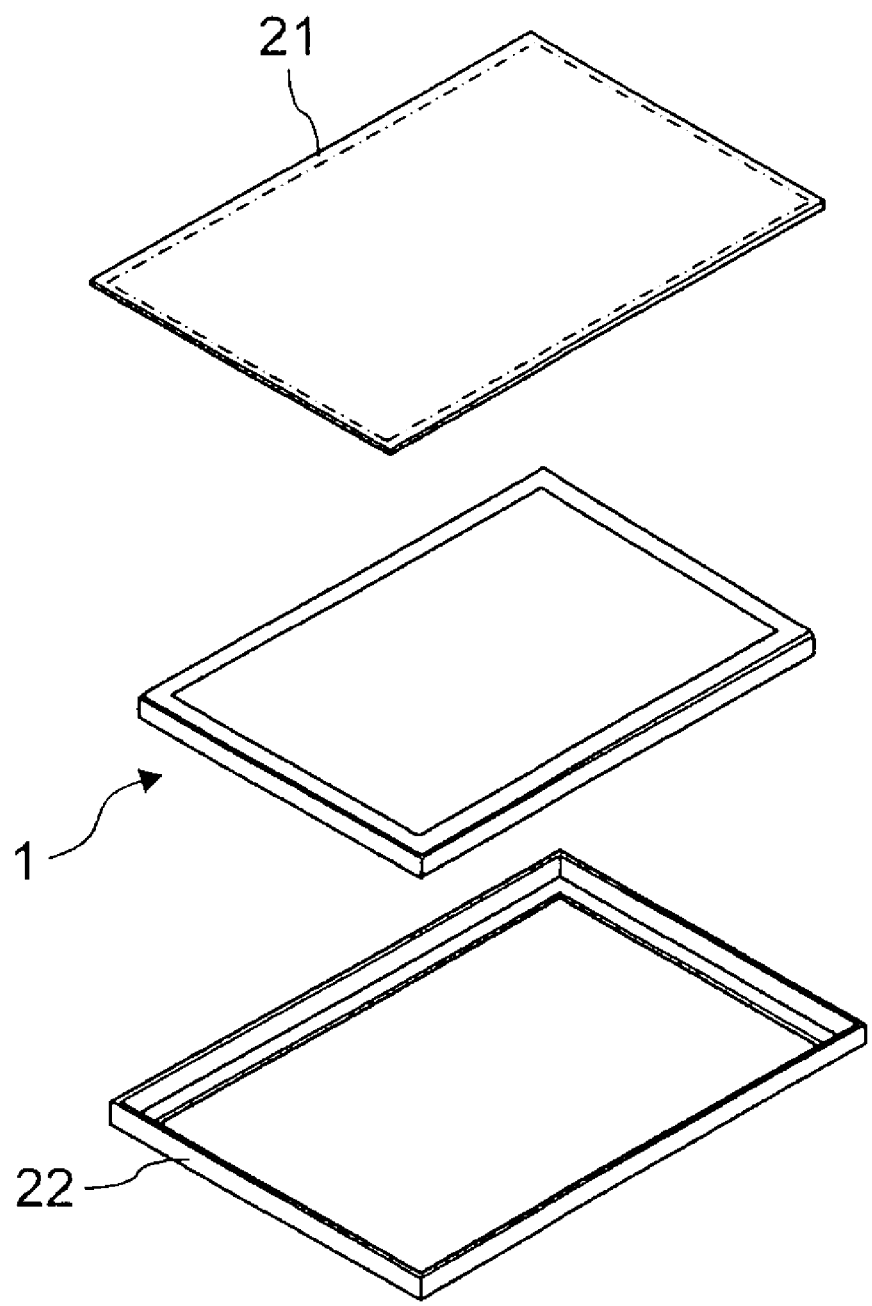
FIG. 8 is an exploded perspective view showing an example of a liquid crystal display device.

The above mentioned backlight unit 1 according to this invention is implemented in the liquid crystal display device as a flat light source. Herein the liquid crystal display device equipped with the backlight unit 1. will be explained. FIG. 8 is an exploded perspective view of an example of the liquid crystal display device. The liquid crystal display device includes a liquid crystal display panel 21 and the backlight unit 1, which are contained and held in an outer case 22. The liquid crystal display panel 21 is formed by injecting liquid crystal material between an array substrate and a counter substrate. Pixel electrodes and switching elements (Thin Film Transistor:TFT) are formed on the array substrate in a matrix corresponding to pixels. Moreover, signal lines to supply image signals to the pixel electrodes and gate lines to supply switching signals to the TFTs are formed so as to cross each other. On the other hand, a counter electrode is formed on the entire counter substrate, for example, by a transparent electrode material (for example, ITO). Color filter layers are formed corresponding to each pixel. Further, polarizers are attached to respective outer surfaces of the array substrate and to the counter substrate so that polarizing axes orthogonally cross each other.

A driving circuit unit having driving TFTs to supply driving signals is formed in a frame area of the array substrate and images are displayed by driving the driving TFTs based on driving signals from outside circuit board. The area where the images are displayed is a display area. The liquid crystal display panel 21 includes the display area in which a plurality of pixels are arranged in a matrix.

The backlight unit 1 is implemented in the liquid crystal display panel 21 as a light source. Light emitted from the LEDs 2 is guided to the light guide plate 4 and illuminates the valid display area of the liquid crystal display panel 21 as a flat light source after passing the light guide plate 4. In the liquid crystal display panel 21, characters or images are displayed with a pre-determined brightness by switching the illuminated light through the liquid crystal layer.

The valid light emitting area of the backlight unit 1 is formed so that the size of the valid light emitting area of the backlight unit 1 is almost the same or larger than that of the liquid crystal display panel 21.

According to the present invention, it is possible to pass around the connection flexible substrate 10 by forming an inclined cut out edge in a side edge of the light guide plate 4 with achieving a narrow frame. Since the inclined angle of the cut out edge of the side edge is much larger, and closer, to 180 degrees than the conventional rectangular corner. That is, orthogonal corner portions are not formed to pass around the connection flexible substrate in the backlight unit. Therefore, the bright lines may not be observed and it becomes possible to raise the product quality and suppress cracks by increasing the mechanical strength.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understood that within the scope of the appended claims, the present invention may be practiced other than as specifically disclosed herein.

What is claimed is:

1. A backlight unit, comprising:
a rectangular light guide plate including a first edge and a second edge orthogonally crossing each other;
a flexible substrate arranged along the first edge of the light guide plate;
a light source arranged on the flexible substrate and emitting light to the first edge of the light guide plate, light emitted from the light source being emitted to outside from an upper surface of the rectangular light guide plate;
a connection flexible substrate electrically connected to the light source arranged on the flexible substrate and arranged along the second edge of the light guide plate to outside of the backlight unit;
a back case to contain the light guide plate, the back case including a first side wall and a second side wall to surround the light guide plate and a concave drawing portion formed in the second side wall facing the second edge of the light guide plate to draw the connection flexible substrate to outside of the back case; and
a reflective sheet arranged under the light guide plate and having a main plate and a side wall built on an edge of the main plate adjacent to the second edge of the light guide plate to reflect light incident to the light guide plate to an upper surface of the light guide plate, and the sidewall of the reflective sheet being arranged along the second edge of the light guide plate so as to cover the second edge, wherein
the second edge of the light guide plate facing the connection flexible substrate is cut out at an acute angle to the first edge of the light guide plate in a first distance from the first edge, forming an inclined cut out edge on the second edge,
the concave drawing portion of the back case is located in a second distance shorter than the first distance from the first edge, and
the connection flexible substrate is arranged in a gap between the side wall of the reflective sheet and the back case extending to the concave drawing portion.

2. The backlight unit according to claim 1, wherein,
the light guide plate is pushed to the second side wall from a third edge of the light guide plate opposed to the second edge of the light guide plate by an elastic element, and
the elastic element is arranged at the third edge of the light guide plate closer to a fourth edge of the light guide plate opposed to the first edge than the first edge of the light guide plate.

3. The backlight unit according to claim 2, wherein the second edge of the light guide plate facing the elastic element arranged at the third edge of the light guide plate is a flat edge connected to the inclined cut out edge.

4. The backlight unit according to claim 2, wherein the connection flexible substrate is drawn from a concave drawing portion formed in the second frame edge.

5. The backlight unit according to claim 2, wherein the elastic element is equipped in a holding element arranged along the third edge of the light guide plate.

6. The backlight unit according to claim 1, wherein the light guide plate is pushed to the second side wall from a third edge opposed to the second edge by an elastic element, the elastic element is equipped in a holding element arranged along the third edge of the light guide plate, and the connection flexible substrate is drawn from a concave drawing portion formed at the second edge.

7. The back light unit according to claim 1, wherein the second edge of the light guide plate facing the connection flexible substrate includes a first flat edge portion, the inclined cut out edge portion at an acute angle to the first edge connected the first flat edge portion and a second flat edge portion connected to the inclined cut out edge portion orthogonally extending to the first edge of the light guide plate.

8. The back light unit according to claim 7, wherein the light guide plate is held by a frame having a first frame edge and a second frame edge corresponding to the first and second edges of the light guide plate and pushed to the second edge of the frame from a third edge of the light guide plate opposed to the second edge by an elastic element.

9. A backlight unit, comprising:
  a rectangular light guide plate including a first edge and a second edge orthogonally crossing each other;
  a flexible substrate arranged along the first edge of the light guide plate;
  a light source arranged on the flexible substrate and emitting light to the first edge of the light guide plate, light emitted from the light source being emitted to outside from an upper surface of the rectangular light guide plate;
  a connection flexible substrate electrically connected to the light source arranged on the flexible substrate and drawn along the second edge of the light guide plate to outside of the backlight unit;
  an upper frame to cover the light guide plate defining a valid illumination area;
  a back case to contain the light guide plate, the back case including a first side wall and a second side wall to surround the light guide plate and a concave drawing portion formed in the second side wall facing the second edge of the light guide plate to draw the connection flexible substrate to outside of the back case; and
  a reflective sheet arranged under the light guide plate and having a main plate and a side wall built on an edge of the main plate adjacent to the second edge of the light guide plate to reflect light incident to the light guide plate to an upper surface of the light guide plate, and the sidewall of the reflective sheet being arranged along the second edge of the light guide plate so as to cover the second edge, wherein
  the second edge of the light guide plate facing the connection flexible substrate is cut out at an acute angle to the first edge of the light guide plate in a first distance from the first edge, forming an inclined cut out edge on the second edge,
  the concave drawing portion of the back case is located in a second distance shorter than the first distance from the first edge,
  the connection flexible substrate is arranged in a gap between the side, wall of the reflective sheet and the second side wall of the back case extending to the concave drawing portion, and
  the cut out edge crosses with the first edge of the light guide plate outside of the valid illumination area.

10. The backlight unit according to claim 9, wherein the light guide plate is held by a frame having a first frame edge and a second frame edge corresponding to the first and second edges of the light guide plate and pushed to the second edge of the frame from a third edge of the light guide plate opposed to the second edge by an elastic element.

11. The backlight unit according to claim 10, wherein the elastic element is equipped in a holding element in a rod shape arranged along the third edge of the light guide plate.

12. A liquid crystal display device, comprising:
  a backlight unit including:
  a rectangular light guide plate including a first edge and a second edge orthogonally crossing each other;
  a flexible substrate arranged along the first edge of the light guide plate;
  a light source arranged on the flexible substrate and emitting light to the first edge of the light guide plate, light emitted from the light source being emitted to outside from an upper surface of the rectangular light guide plate;
  a connection flexible substrate electrically connected to the light source arranged on the flexible substrate and drawn along the second edge of the light guide plate to outside of the backlight unit,
  wherein the second edge of the light guide plate facing the connection flexible substrate is cut out at an acute angle to the first edge of the light guide plate in a first distance from the first edge forming an inclined cut out edge; and
  a back case to contain the light guide plate, the back case including a first side wall and a second side wall to surround the light guide plate and a concave drawing portion being formed in the second side wall facing the second edge of the light guide plate to draw the connection flexible substrate to outside of the back case, the concave drawing portion of the back case being located in a second distance shorter than the first distance from the first edge,
  a reflective sheet arranged under the light guide plate and having a main plate and a side wall built on an edge of the main plate adjacent to the second edge of the light guide plate to reflect light incident to the light guide plate to an upper surface of the light guide plate, and the sidewall of the reflective sheet being arranged along the second edge of the light guide plate so as to cover the second edge, the connection flexible substrate being arranged in a gap between the side wall of the reflective sheet and the second side wall of the back case extending to the concave drawing portion, and
  a liquid crystal display panel arranged on the backlight unit,
  wherein the inclined cut out edge of the second edge crosses with the first edge of the light guide plate at outside of a valid display area of the liquid crystal display panel.

13. The backlight unit according to claim 12, wherein
  the light guide plate is pushed to the second side wall from a third edge opposed to the second edge by an elastic element, the elastic element is equipped in a holding element arranged along the third edge of the light guide plate, and the connection flexible substrate is drawn from a concave drawing portion formed at the second edge.

14. The liquid crystal display device according to claim 13, wherein the second edge of the light guide plate facing the elastic element is a flat edge connected to the inclined cut out edge.

* * * * *